United States Patent
Navio Gilaberte et al.

(10) Patent No.: US 9,377,218 B2
(45) Date of Patent: Jun. 28, 2016

(54) SOLAR RECEIVER WITH NATURAL CIRCULATION FOR GENERATING SATURATED STEAM

(75) Inventors: Raúl Navio Gilaberte, Sevilla (ES); Lucía Serrano Gallar, Sevilla (ES); Rafael Osuna Gonzalez-Aguilar, Sevilla (ES); Paula Llorente Folch, Sevilla (ES); Valerio Fernandez Quero, Sevilla (ES)

(73) Assignee: Abengoa Solar New Technologies, S.A., Seville (ES)

( * ) Notice: Subject to any disclaimer, the term of this patent is extended or adjusted under 35 U.S.C. 154(b) by 664 days.

(21) Appl. No.: 13/263,259

(22) PCT Filed: Mar. 31, 2010

(86) PCT No.: PCT/ES2010/000137
§ 371 (c)(1),
(2), (4) Date: Dec. 12, 2011

(87) PCT Pub. No.: WO2010/116010
PCT Pub. Date: Oct. 14, 2010

(65) Prior Publication Data
US 2012/0080027 A1  Apr. 5, 2012

(30) Foreign Application Priority Data
Apr. 6, 2009  (ES) .................................. 200900937

(51) Int. Cl.
*F24J 2/44* (2006.01)
*F24J 2/04* (2006.01)
(Continued)

(52) U.S. Cl.
CPC .... *F24J 2/44* (2013.01); *F24J 2/07* (2013.01); *F24J 2/248* (2013.01); *Y02E 10/41* (2013.01); *Y02E 10/44* (2013.01); *Y02E 10/46* (2013.01)

(58) Field of Classification Search
CPC ............ Y02E 10/41; Y02E 10/44; F24J 2/04; F24J 2/07; F24J 2/24; F24J 2/32
USPC ......... 126/639, 645, 638, 634, 635, 646, 572, 126/585
See application file for complete search history.

(56) References Cited

U.S. PATENT DOCUMENTS 3,924,604 A * 12/1975 Anderson ...................... 126/606
4,143,644 A *  3/1979 Heitland et al. ............... 126/626
(Continued)

FOREIGN PATENT DOCUMENTS

DE         10248068      6/2004
EP         0106688 A2    4/1984
(Continued)

OTHER PUBLICATIONS

International Search Report and Written Opinion of PCT/ES2010/000137, mailed Oct. 14, 2010, 10 pages.
(Continued)

*Primary Examiner* — Alissa Tompkins
*Assistant Examiner* — Benjamin W Johnson
(74) *Attorney, Agent, or Firm* — Kilpatrick Townsend & Stockton LLP

(57) ABSTRACT

The invention relates to a solar receiver with natural circulation for generating saturated steam, which uses water/steam as a heat-transfer fluid and includes a combined circuit for fluid recirculation (forced circulation and natural circulation). The system comprises: water-walls which receive the radiation on the surface thereof and inside which the working fluid changes phase; riser pipes through which the water/steam mix exiting the pipes of the receiver rises towards the drum; downpipes through which the recirculation water descends from the drum to the receiver; and a support pump in order to increase the incident power in the receiver and start up the plant when necessary.

3 Claims, 2 Drawing Sheets

(51) Int. Cl.
*F24J 2/24* (2006.01)
*F24J 2/07* (2006.01)

(56) References Cited

U.S. PATENT DOCUMENTS

| | | | | |
|---|---|---|---|---|
| 4,245,618 A | * | 1/1981 | Wiener | 126/643 |
| 4,285,333 A | * | 8/1981 | Tanaka | F24J 2/402 |
| | | | | 126/586 |
| 4,366,853 A | * | 1/1983 | Bernier | 165/104.22 |
| 4,400,946 A | | 8/1983 | Oplatka | |
| 4,546,758 A | * | 10/1985 | Ebernard | 126/635 |
| 5,413,091 A | * | 5/1995 | Bourke | 126/598 |
| 5,537,990 A | * | 7/1996 | Lee | 126/638 |
| 5,575,244 A | * | 11/1996 | Dethier | 122/406.1 |
| 5,762,031 A | * | 6/1998 | Gurevich | 122/7 R |
| 6,105,538 A | | 8/2000 | Aaltonen | |
| 6,701,711 B1 | | 3/2004 | Litwin | |
| 6,911,110 B2 | | 6/2005 | Blackmon, Jr. et al. | |
| 2005/0126170 A1 | * | 6/2005 | Litwin | 60/641.8 |
| 2008/0041362 A1 | * | 2/2008 | Filippone | 126/567 |

FOREIGN PATENT DOCUMENTS

| | | |
|---|---|---|
| EP | 1 890 035 | 2/2008 |
| EP | 2338007 | 6/2011 |
| ES | 272531 | 11/1983 |
| ES | 2168992 A1 | 6/2002 |
| ES | 2 312 275 | 2/2009 |
| FR | 1129722 | 1/1957 |
| FR | 2 327 499 | 5/1977 |
| JP | S60/164179 | 8/1985 |
| JP | H03/84301 | 4/1991 |
| JP | H10148301 * | 6/1996 |
| JP | H10/148301 | 6/1998 |
| SU | 1023177 | 6/1983 |
| WO | 93/23702 | 11/1993 |
| WO | WO 2008/118980 | 10/2008 |

OTHER PUBLICATIONS

Dey, C.J. "Heat transfer aspects of an elevated linear absorber," Solar Energy, vol. 76, No. 1-3, Jan. 2004, 7 pages.

Ponwesier K et al. "Stabilitaetsbetrachtungen an einem Dampferzeuger mit einem Zwei-Trommel-Buendel", VGB Kraftwerkstechnik, VGB Kraftwerkstechnik GMBH. Essen, DE, vol. 77, No. 3, Mar. 1, 1997, pp. 178-180, (translation not included).

Supplementary European Search Report of EP Patent Application No. 10761214.5, dated Dec. 16, 2013, 7 pages total.

Office Action in European Patent Application No. 10761214.5, mailed Sep. 10, 2014. 4 pages total.

* cited by examiner

SOLAR RECEIVER WITH NATURAL CIRCULATION FOR GENERATING SATURATED STEAM

TECHNICAL FIELD OF THE INVENTION

This invention pertains to the field of technologies for harnessing solar energy for electricity production, ranked among high concentration thermal solar systems, within the framework of the tower central receiver technologies with heliostats field.

The invention describes both the design and the operating system of the receiver, which uses natural circulation as a method of supply of the working fluid to the system.

BACKGROUND OF THE INVENTION

Solar Concentration Systems (SCS) are used to increase the flux density of solar radiation so that the temperatures reached by the working fluid are those required for its use in industrial processes and in processes of power generation.

Within the SCS there are the Tower Central Receiver Systems, where solar radiation is concentrated by using heliostats in a receiver located on top of a tower (in the focus of the optical system) and where it is transformed into thermal energy by the absorption of heat from the working fluid.

A first approach to the tower central receiver technology was defined in the U.S. Pat. No. 3,924,604, 1974; the receiver described there, exterior-type and with tubes arranged around the central axis of the tower, is located on top of the same, which in turn is located in the middle of a field of heliostats arranged circularly. Later, in 1983, a new configuration for a tower solar concentration plant was described by the U.S. Pat. No. 4,400,946, where steam generation in a receiver arranged in a ring of a circular sector of the circle described by the tower was set forth; since then, other patents have been published regarding this technology seeking to optimize the various elements and processes of the system, such as U.S. Pat. No. 6,911,110 and WO2008118980, published in 2005 and 2008 respectively.

Currently, commercial demonstration projects using cavity-type receivers can be found. One of the most outstanding projects in this field is that of PS10 in Seville, which has a saturated steam cavity receiver. On the other hand, the Plataforma Solar de Almeria, where the project CESA-I was developed, has the necessary infrastructure for carrying out the testing of pilot-sized solar components among which volumetric type receivers have been tested, wherein is used air as heat-transfer fluid. The design of these devices should be done such as to optimize their operation, thus preventing both heat loss (especially by radiation and convection) and the pressure drops. Patent ES2168992 published in 2002, refers to the use of volumetric receivers in solar concentration systems.

The saturated steam tower technologies currently available require the use of drive pumps to increase the working fluid to the receiver, and this causes that the pressure drops are much greater than those resulting from the system proposed in this invention.

However, in the case of plants producing electricity with fossil fuel, there is the concept of natural circulation, since in these the dimensions of the drums are much larger and facilitate the application of this phenomenon.

In the case of solar receivers the dimensions handled are much smaller and do not facilitate the natural circulation.

This invention pose the use of natural circulation with a new design of components that helps reduce circuit pressure drops, as an alternative to increase the efficiency of the system.

Its implementation will allow the recirculation of the fluid to be carried out without the use of pumps.

The proposed innovation seeks to exploit one of the physical properties of the working fluid (density) in the operating conditions which, under a proper configuration of the circuit components (equipment elevations, lengths and diameters of tubes), can result in the natural circulation phenomenon. The introduction of this improvement makes more feasible to use technology at commercial production levels since the recirculation of water through a closed circuit is achieved, without requiring pumps, reducing self-consumption of the plant (electricity consumption of auxiliary components) and increasing the net production of electricity of the same.

Thus, there is proposed a new improvement both for the receiver as a component of the solar concentration system, and for the processes involved in the generation of saturated steam. The design of a tower solar receiver for the generation of saturated steam with natural circulation is completely novel and unique in the world.

DESCRIPTION OF THE INVENTION

The design of a circuit that uses natural circulation for the supply of the working fluid to the receiver, allows more efficient use of solar energy since it minimizes the pressure drops in the solar component, favoring the ascent without drive of the fluid through the receiver tubes and removing the need for forced recirculation of the same. The foregoing is presented as the main technological advantage of the proposed system compared to currently available devices.

The natural circulation is based on the physical fact that, by decreasing the density of a fluid, it tends to rise. So, if you have a hot focus, in a lower zone (receiver) and a cold focus in a higher zone (drum), natural circulation is achieved between the two foci, being able to eliminate the recirculation pumps. These pumps can be eliminated as long as the recirculation flow rate is sufficient to cool the receiver. The higher the cold focus is with respect to the hot, the recirculation flow rate obtained will be higher. The smaller the pressure drop of the system, the higher the recirculation flow rate will be; the foregoing may be achieved by increasing the diameters or areas of passage of the pipes so as to favor the natural circulation.

In the proposed circuit of recirculation of the working fluid of a tower solar receiver, the supply water is introduced in the drum, this is done in order to keep the cold focus over the hot focus and far away enough from it, so that the water/steam flow rate that rises through the receiver, and reaches the drum is high enough to maintain the flow of fluid in the circuit by natural circulation. This is why the arrangement described of the equipment and the input current to the fluid circuit, promotes natural circulation and allows dispensing with the pumps once the recirculation flow rate conditions necessary for this phenomenon to take place have been reached.

The water descending from the drum flows through the receiver by natural circulation, where the change of phase to saturated steam occurs due to the incident power from the heliostats; saturated steam arrives to the top of the receiver, which flows back into the drum where the total separation of phases takes place.

The system described above is the base of design of the recirculation circuit of the solar receiver with natural recirculation.

The receiver consists of the following parts:

Water-walls: The receiving system consists of a series of panels constituted by several tubes arranged vertically with a suitable configuration to maximize the reception of radiation reflected by the field of heliostats, moreover, the tubes have been designed so that their diameters (greater than those used in these devices at present), promote the natural circulation of the fluid taking into account the dimensions of the receiver and its spatial arrangement. Thus minimizing pressure drops is achieved. In addition, these tubes have fins that facilitate the link among them and prevent the passage of radiation from the heliostats to the insulation located on the back of the receiver which could result in damage to it; these fins have the minimum possible size, with the object of avoiding hot spots on the structure of the receiver since they are not refrigerated.

Downpipes: connecting the drum with the lower collectors of the receiver (the collector being the pipe that distributes recirculation water to the different tubes of the receiver). To avoid high pressure drops, these pipes have been designed with a diameter greater than that of current solar receivers, in order to promote natural circulation.

Riser pipes: pipe that connects the upper part of the receiver with the drum. As in the previous case, it has been designed with a diameter higher than usual to reduce the pressure drop.

For proper operation and cooling of the receiver in case of high increases of the incident power or low incident power (plant start ups), a greater flow rate of additional recirculation is required. This is why, in the bottom between the downpipes and the receiver, it is also included a recirculation pump to support the natural circulation.

The circuit of the receiver described above: it has a mixed control system implemented by computer, which governs a series of valves so that the optimum conditions of pressure, temperature and recirculation flow rate of the circuit are maintained, required for the natural circulation to take place in the system. There are level, temperature and pressure meters in the drum; control valve of the current of supply water to the drum; heat flux and temperature sensors in the receiver; flow rate meters and control valves in the downpipes.

The advantages of the components in this invention, as well as of its overall configuration are:

Elimination of the dependence on drive mechanical systems for the recirculation of the fluid to the receiver.

Reduction of the pressure drops along the circuit.

Flexibility of operation against flow increases by having a recirculation mixed circuit that uses natural circulation and support pumps for forced circulation.

Increase of the net electrical energy produced in the solar concentration system.

DESCRIPTION OF THE DRAWINGS

To complement the description being made and in order to achieve a better understanding, it has been represented, according to a preferred embodiment of the same.

PREFERRED EMBODIMENT OF THE INVENTION

Figure 1:
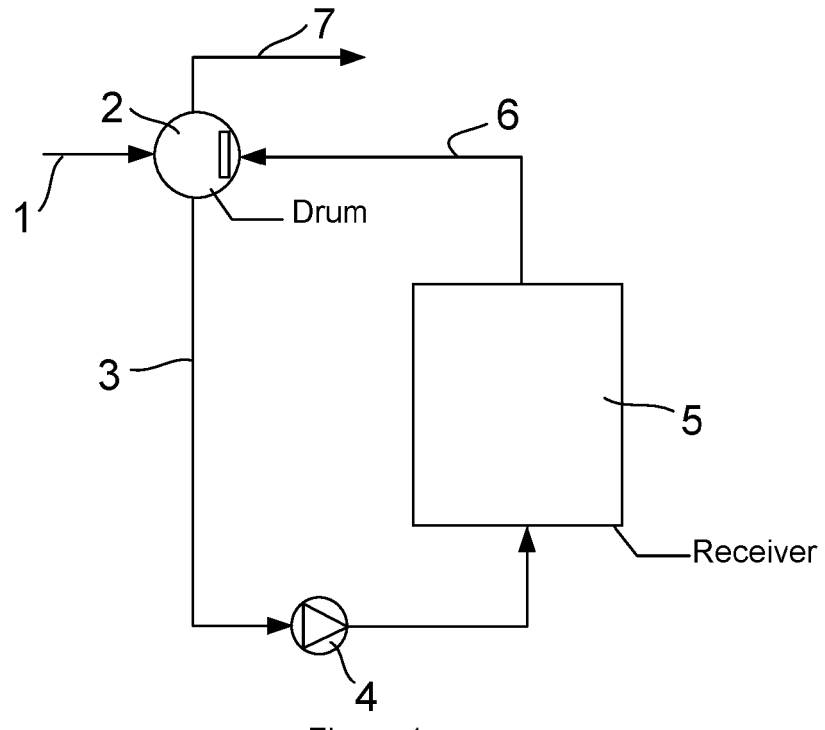
FIG. 1: Typical forced recirculation circuit (with recirculation pump).

FIG. 1 shows a typical forced circulation circuit used in solar plants with tower technology, the main components of which are a drum (2), a receiver (5) in the middle and a recirculation pump (4) that moves fluid to the receiver. The drum is supplied with a water current (1) that is carried from the drum by the downpipes (3) up to the pump (4) that drives it to the receiver (5) where it is transformed into a saturated steam and water mixture that, through the riser pipes (6), returns to the drum. The saturated steam exits from the circuit through the current (7) and is subsequently used to produce electricity.

Figure 2:
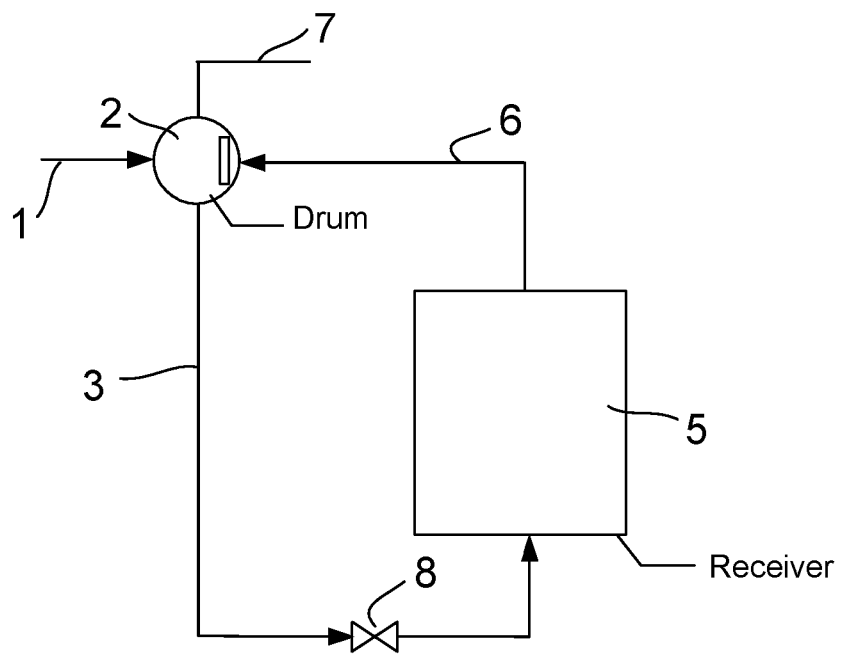
FIG. 2: Natural circulation circuit (no recirculation pump or pumps).

FIG. 2 shows a tower solar receiver wherein the natural circulation phenomenon is used to recirculate the working fluid to the receiver. In this case the drum (2) is supplied with a water current (1) that subsequently exits the drum through the downpipes (3) passing by a valve (8) and flows to the receiver (5). There, it is transformed into saturated steam that, due to natural circulation and through the riser pipes (6), returns to the drum without the need of pumps. The saturated steam exits the circuit through the current (7) and is subsequently used to produce electricity.

Figure 3:
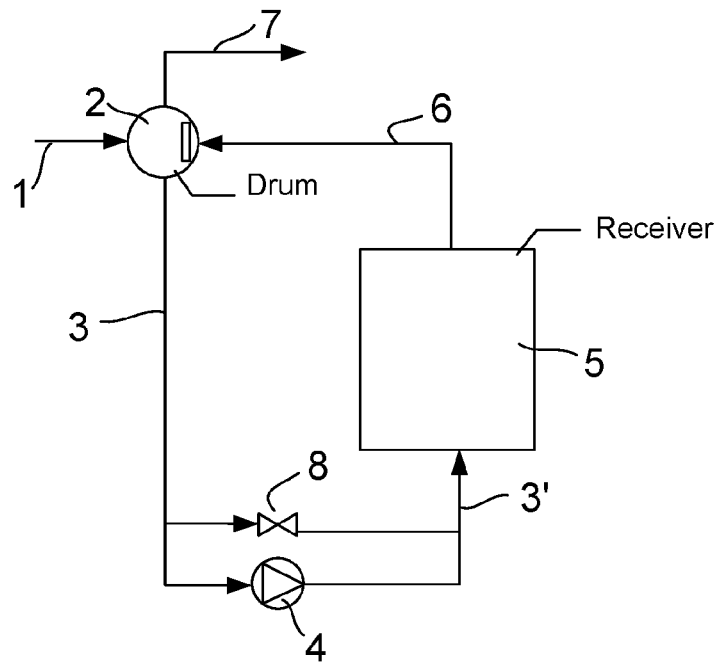
FIG. 3: Mixed circuit or double circuit, one for natural circulation and another one or forced circulation (by the path of the pump).

FIG. 3 shows the natural circulation and forced circulation mixed circuit object of this invention, which includes, with respect to FIG. 2 a support pump. In the proposed circuit the supply water (1) is introduced into the drum (2). The water descending from the drum (2) through the downpipes (3) flows through the receiver (5) by natural circulation. On its way to the receiver (5) it passes through a valve (8) which is responsible for regulating the flow rate of recirculating water. At the receiver (5) there is the phase change to saturated steam due to the incident power from the heliostats. Saturated steam reaches to the top of the receiver (5), which will flow through the riser pipe (6) back into the drum (2) where the separation of phases takes place. The stream of saturated steam (7) exits the circuit to produce electricity.

In the case of incident power increases in the receiver (5), which would cause the need to increase the recirculation flow rate to it, the circuit has a support pump (4) that ensures the continuity of the operation of the system.

Figure 4:
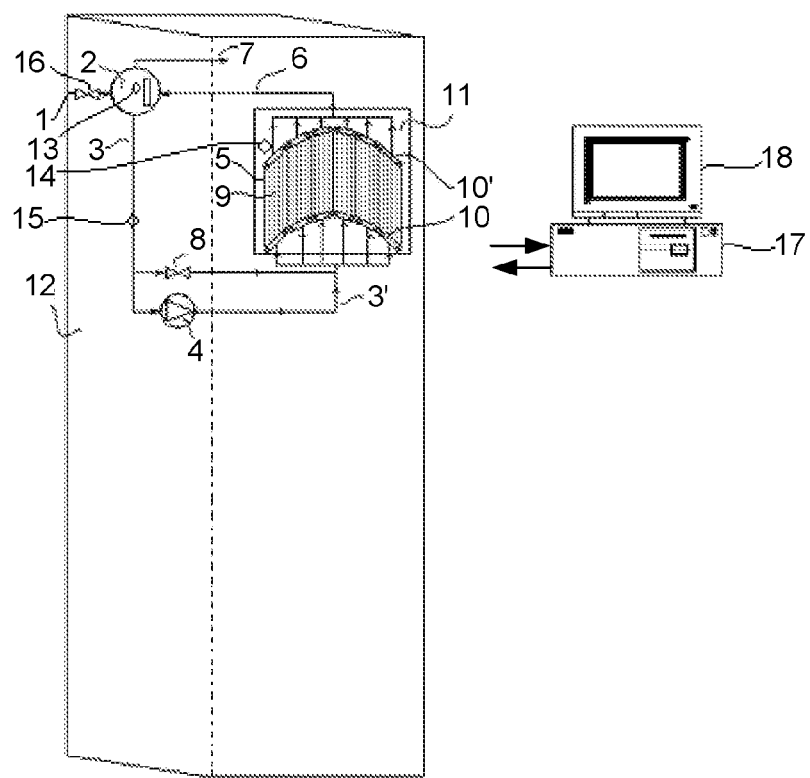
FIG. 4: Tower central receiver with recirculation mixed circuit.

FIG. 4 shows the central receiver with recirculation mixed circuit in the cavity of the top of a tower. The circuit shown in the above figure is now located in a cavity (11) within the top of a tower (12). The downpipes (3, 3') connect the drum (2) with the lower collectors (10) of the receiver (where the collector is the pipe that distributes the supply water (1) to the various tubes of the receiver). To prevent high pressure drops, these pipes (3, 3') have been designed with a diameter larger than that of the current solar receivers, in order to promote natural circulation. On its way to the receiver it passes through a valve (8) which is responsible for regulating the flow rate of recirculation water. Level, temperature, and pressure sensors (13) are disposed in drum (2). Heat flux and temperature sensors (14) are located in the receiver (5). A flow rate meter (15) and control valve (8) are placed within downpipe (3). A control valve (16) controls the current of supply water to the drum (2).

The receiving system consists of a series of panels (9) made up of several tubes arranged vertically with a suitable configuration to maximize the reception of radiation reflected by the field of heliostats, in addition, the tubes have been designed so that their diameters (greater than those used in these devices at present), promote the natural circulation of the fluid taking into account the dimensions of the receiver and its spatial arrangement. In this way minimizing the pressure drops is achieved. In addition, these tubes have fins that facilitate the link between them and that prevent the passage of radiation from the heliostats to the insulation located on the back of the receiver which could result in damage to it; these fins have the minimum possible size, with the object of avoiding hot spots on the structure of the receiver since they are not cooled.

The riser pipe (6) connects the upper collector of the receiver (10') with the drum (2) and as in the previous case, is designed with a diameter larger than usual to reduce the pressure drop. The saturated steam exits the circuit through the current (7) and is subsequently used to produce electricity.

At the bottom between the downpipes (3, 3') and the receiver, a recirculation pump (4) to support the natural circulation is also included, for cases of high flows or to start up the plant.

In addition, the solar receiver assembly of the invention is governed by a natural and forced circulation mixed control system (17) implemented by computer (18) through which the conditions of temperature, pressure and flow rate are monitored, and which governs a series of valves to maintain the optimum operating conditions in the circuit, required so that the natural circulation takes place.

The invention claimed is:

1. A solar receiver with natural circulation for generating saturated steam, comprising:
    a hot focus including a receiver, the receiver including lower collectors and upper collectors, the lower collectors and the upper collectors connected by tubes that are disposed vertically;
    a cold focus including a drum located over the hot focus;
    at least one downpipe connected to the drum and the lower collectors of the receiver, the at least one downpipe configured to direct a working fluid produced from the drum towards the lower collectors of the receiver and then through the tubes connecting the lower and the upper collectors, to the upper collectors;
    at least one riser pipe connected to upper collectors of the receiver and the drum, the at least one riser pipe configured to direct the working fluid from the upper collectors of the receiver to the drum;
    level, temperature, and pressure meters in the drum;
    heat flux and temperature sensors in the receiver;
    a flow rate meter and a control valve in the at least one downpipe;
    a control valve that controls a current of supply water to the drum; and
    a mixed control system implemented by a computer that controls the control valves based on measurements from the meters and sensors, in response to changes in incident power on the receiver;
    wherein a circulation of the working fluid through the at least one downpipe and the at least one riser pipe includes natural circulation,
    wherein the at least one downpipe and the at least one riser pipe, the cold focus, and hot focus are configured to promote the natural circulation and reduce pressure drops;
    and wherein the solar receiver further comprises a recirculation pump auxiliary system for support of natural circulation for use in cases of high densities of radiation fluxes in the receiver or for plant startups, resulting in a mixed system of natural and forced circulation;
    and wherein the control valve in the at least one downpipe is configured to regulate a flow rate of recirculation, the control valve in the at least one downpipe and the recirculation pump being connected in parallel between the at least one downpipe and the receiver, wherein once conditions necessary for natural circulation have been reached, the recirculation pump can be dispensed with such that the naturally circulating working fluid flows through the control valve in the at least one downpipe.

2. The solar receiver with natural circulation for generating saturated steam according to claim 1, wherein the mixed control system governs the control valve of the current of supply water to the drum and the control valve in the at least one downpipe and is configured to regulate the flow rate of recirculation so that optimum conditions of pressure, temperature and recirculation flow rate, required for the natural circulation to take place, are maintained in the circuit.

3. A method for naturally circulating a working fluid in the solar receiver according to claim 1, the method comprising:
    feeding the drum with a current of water, which subsequently exits the drum by the at least one downpipe and arrives to the receiver;
    transforming the current of water into saturated steam in the receiver which, by natural circulation, travels through the at least one riser pipe and returns to the drum;
    using the saturated steam to produce electricity; and
    using the recirculation pump auxiliary system to support natural circulation to ensure continued operation of the system.

\* \* \* \* \*